United States Patent
Miyata

(10) Patent No.: US 8,948,062 B2
(45) Date of Patent: Feb. 3, 2015

(54) RADIO BASE STATION AND RADIO COMMUNICATION METHOD

(75) Inventor: Takeo Miyata, Daito (JP)

(73) Assignee: KYOCERA Corporation, Kyoto (JP)

( * ) Notice: Subject to any disclaimer, the term of this patent is extended or adjusted under 35 U.S.C. 154(b) by 190 days.

(21) Appl. No.: 13/504,683

(22) PCT Filed: Oct. 19, 2010

(86) PCT No.: PCT/JP2010/068373
§ 371 (c)(1),
(2), (4) Date: Apr. 27, 2012

(87) PCT Pub. No.: WO2011/052430
PCT Pub. Date: May 5, 2011

(65) Prior Publication Data
US 2012/0213128 A1    Aug. 23, 2012

(30) Foreign Application Priority Data
Oct. 28, 2009   (JP) ................. 2009-247500

(51) Int. Cl.
*H04W 72/04*   (2009.01)
*H04W 88/08*   (2009.01)
*H04B 7/04*    (2006.01)
(Continued)

(52) U.S. Cl.
CPC .......... *H04W 88/085* (2013.01); *H04B 7/0426* (2013.01); *H04B 7/0689* (2013.01); *H04B 7/0691* (2013.01); *H04W 52/42* (2013.01); *H04B 7/0697* (2013.01); *H04L 5/0007* (2013.01)
USPC ....................................... 370/277

(58) Field of Classification Search
CPC ......... H04B 1/401; H04W 88/10; H04W 4/00
USPC .......................................... 370/328, 329, 337
See application file for complete search history.

(56) References Cited

U.S. PATENT DOCUMENTS

2006/0125601 A1   6/2006  Onishi
2008/0102872 A1   5/2008  Liu
(Continued)

FOREIGN PATENT DOCUMENTS

EP    1 739 988 A1    1/2007
JP    2003-037547 A   2/2003
(Continued)

OTHER PUBLICATIONS

International Search Report dated Dec. 14, 2010, issued for International Application No. PCT/JP2010/068373.

*Primary Examiner* — Un C Cho
*Assistant Examiner* — Peter Mak
(74) *Attorney, Agent, or Firm* — Procopio, Cory, Hargreaves & Savitch LLP

(57) ABSTRACT

RRHs are physically independent from each other, are arranged in different positions, respectively, receive uplink signals from a radio terminal and transmit downlink signals to the radio terminal. A central processing unit receives the uplink signals from the plurality of RRHs and transmits the downlink signals to the plurality of RRHs. A setting unit sets a part or all of the RRHs as RRH(s) in a first group suitable for transmission of the downlink user data based on the uplink or downlink signals received by at least one of the RRHs. A transmission control unit controls the transmission of the downlink user data from the plurality of RRHs based on the setting.

4 Claims, 12 Drawing Sheets

(51) Int. Cl.
*H04B 7/06* (2006.01)
*H04W 52/42* (2009.01)
*H04L 5/00* (2006.01)

(56) References Cited

U.S. PATENT DOCUMENTS

2008/0199183 A1  8/2008  Liu et al.
2009/0072947 A1  3/2009  Onishi
2009/0207780 A1* 8/2009  Kishigami et al. ............ 370/328
2009/0247092 A1* 10/2009 Beaudin et al. ................. 455/73
2011/0194548 A1* 8/2011 Feder et al. .................... 370/338

FOREIGN PATENT DOCUMENTS

| JP | 2006-128950 A | 5/2006 |
| JP | 2007-531424 A | 11/2007 |
| JP | 2007-533178 A | 11/2007 |
| JP | 2008-506321 A | 2/2008 |
| JP | 2008-060851 A | 3/2008 |
| JP | 2008-167479 A | 7/2008 |
| JP | 2009-206735 A | 9/2009 |

* cited by examiner

FIG.4

| LEVEL | MIMO SCHEME | MCS | DATA TRANSMISSION RATE(bit/sym) |
|---|---|---|---|
| A1 | MATRIX-A | QPSK 1/2 | 1 |
| A2 | MATRIX-A | QPSK 3/4 | 1.5 |
| A3 | MATRIX-A | 16QAM 1/2 | 2 |
| A4 | MATRIX-A | 16QAM 3/4 | 3 |
| A5 | MATRIX-A | 64QAM 1/2 | 3 |
| A6 | MATRIX-A | 64QAM 2/3 | 4 |
| A7 | MATRIX-A | 64QAM 3/4 | 4.5 |
| B1 | MATRIX-B | QPSK 1/2 | 2 |
| B2 | MATRIX-B | QPSK 3/4 | 3 |
| B3 | MATRIX-B | 16QAM 1/2 | 4 |
| B4 | MATRIX-B | 16QAM 3/4 | 6 |
| B5 | MATRIX-B | 64QAM 1/2 | 6 |
| B6 | MATRIX-B | 64QAM 2/3 | 8 |
| B7 | MATRIX-B | 64QAM 3/4 | 9 |

FIG.11

| LEVEL | MCS | DATA TRANSMISSION RATE(bit/sym) |
|---|---|---|
| A1 | QPSK 1/2 | 1 |
| A2 | QPSK 3/4 | 1.5 |
| A3 | 16QAM 1/2 | 2 |
| A4 | 16QAM 3/4 | 3 |
| A5 | 64QAM 1/2 | 3 |
| A6 | 64QAM 2/3 | 4 |
| A7 | 64QAM 3/4 | 4.5 |

RADIO BASE STATION AND RADIO COMMUNICATION METHOD

TECHNICAL FIELD

The present invention relates to a radio base station and a radio communication method, and particularly to a radio base station provided with RRHs (Remote Radio-frequency Heads) as well as a radio communication method for the radio base station.

BACKGROUND ART

In radio communications, there has been a problem that efficiency of frequency usage lowers at a cell edge. Therefore, the IMT-Advanced (4th-generation mobile communications system) and others are studying a method that deals with this problem by performing link control on a plurality of base stations.

However, when a radio terminal receives signals for a plurality of link-controlled radio base stations, distances between the radio terminal and the respective radio base stations are different from each other. Therefore, differences occur in signal reception timing according to which the radio terminal receives the signals from the plurality of link-controlled radio base stations. Also, the signals transmitted from the plurality of link-controlled radio base stations are the signals produced by the different radio base stations so that there are differences in frequency offset.

Accordingly, instead of performing the link-control on completely different radio base stations, such a method has been proposed that separates RRHs that are radio parts from the same radio base station, and disperses them in a plurality of locations, respectively (e.g., see PTL 1 (National Publication No. 2008-506321).

According to this method, signals transmitted from the plurality of RRHs are produced by the same radio base station so that no difference occurs in frequency offset between the signals received from the plurality of RRHs.

CITATION LIST

Patent Literature

PTL 1: National Publication No. 2008-506321

SUMMARY OF INVENTION

Technical Problem

However, according to the method disclosed in the PTL 1 (National Publication No. 2008-506321), the radio terminal can receive the signals from the plurality of RRHs with the same frequency offset, but differences occur in reception timing of the signals received from the plurality of RRHs.

Also, all the RRHs are not necessarily in good communication environment, and transmission of signals to the radio terminal with such RRHs results in spreading of interference to other radio terminals and other radio base stations, which is undesired.

Conversely, when only some of the RRHs are used for transmitting signals to the radio terminal, a covered area is small so that communication interruption is liable to occur when the radio terminal is moving fast, which is not appropriate.

Accordingly, an object of the invention is to provide a radio base station and a radio communication method that allow a radio terminal to receive appropriately signals from a plurality of RRHs.

Solution to Problem

For overcoming the above problem, the invention includes a plurality of remote radio heads being physically independent of each other, and arranged in different positions, respectively, for receiving an uplink signal from a radio terminal and transmitting a downlink signal to the radio terminal; and a central processing unit for receiving the uplink signal from the plurality of remote radio heads, and transmitting the downlink signal to the plurality of remote radio heads. The central processing unit includes a setting unit for setting a part or all of the plurality of remote radio heads as the remote radio heads in a first group suitable for transmission of downlink user data, based on the uplink signal or the downlink signal received by at least one of the plurality of remote radio heads, and a transmission control unit for controlling transmission of the downlink user data from the plurality of remote radio heads based on the setting.

Preferably, the transmission control unit performs control such that the transmission power for transmission of the downlink user data from the remote radio head other than the remote radio heads in the first group may be smaller than the transmission power for transmission of the downlink user data from the remote radio head in the first group.

Preferably, the transmission control unit performs the control such that the central processing unit may transmit the downlink user data to the plurality of remote radio heads, and only the remote radio heads in the first group may transmit the downlink user data.

Preferably, the transmission control unit performs the control such that the central processing unit transmits the downlink user data only to the remote radio head in the first group.

Preferably, the setting unit sets all of the plurality of remote radio heads as the remote radio heads in the first group when it is determined that the radio terminal having transmitted the uplink signal is moving fast, based on the uplink signal received by at least one of the plurality of remote radio heads.

Preferably, the setting unit sets all of the plurality of remote radio heads as the remote radio heads in the first group when at least one of the plurality of remote radio heads receives the uplink signal at a reception level equal to or smaller than a predetermined value.

Preferably, the setting unit sets all of the plurality of remote radio heads as the remote radio heads in the first group when a communication level of the uplink signal transmitted from the radio terminal or the downlink signal transmitted to the radio terminal corresponds to a minimum level of a data transfer rate within a range allowing setting.

Preferably, the setting unit detects reception timing of the uplink signal from the plurality of remote radio heads, and sets the two or more remote radio heads receiving the uplink signals exhibiting a difference in the reception timing equal to or smaller than a predetermined value as the remote radio heads in the first group.

Preferably, the setting unit detects an error in the uplink signals transmitted from the plurality of remote radio heads, and sets the remote radio heads receiving the uplink signal satisfying certain conditions representing the fact that the errors are few as the remote radio heads in the first group.

Preferably, the radio base station further includes a quality managing unit for obtaining or calculating a communication quality of the downlink signal in the radio terminal; and an MIMO switching unit for switching the setting of the MIMO scheme from the space-time coding scheme to the spatial multiplexing coding scheme based on the communication quality. The transmission control unit performs the control to provide one data stream to the remote radio heads in the first group by performing space-time coding on the one data stream when the set MIMO scheme is the space-time coding scheme, and to provide the plurality of data streams to the remote radio heads in the first group by performing the spatial multiplexing on the plurality of data streams when the set MIMO scheme is the spatial multiplexing coding scheme. The MIMO switching unit lowers conditions to be satisfied for a communication quality at the time of switching the setting of the MIMO scheme from the space-time coding scheme to the spatial multiplexing coding scheme, as compared with the conditions to be satisfied when the remote radio head belonging to the first group is one in number, in the case where the plurality of remote radio heads belong to the first group.

The invention provides a radio communication method of a radio base station including a plurality of remote radio heads being physically independent of each other, and arranged in different positions, respectively, for receiving an uplink signal from a radio terminal and transmitting a downlink signal to the radio terminal, and the method includes the steps of setting, by a central processing unit, a part or all of the plurality of remote radio heads as the remote radio heads in a first group suitable for transmission of downlink user data, based on the uplink signal or the downlink signal received by at least one of the plurality of remote radio heads; and controlling, by the central processing unit, transmission of the downlink user data from the plurality of remote radio heads based on the setting.

Advantageous Effects Of Invention

According to the invention, the radio terminal can appropriately receive signals from the plurality of RRHs.

BRIEF DESCRIPTION OF DRAWINGS

FIG. 4 shows an example of a down communication level table.

FIG. 11 shows an example of an up communication level table.

DESCRIPTION OF EMBODIMENTS

Embodiments of the invention will be described below.

First Embodiment

Structure of Radio Communication System

Figure 1:
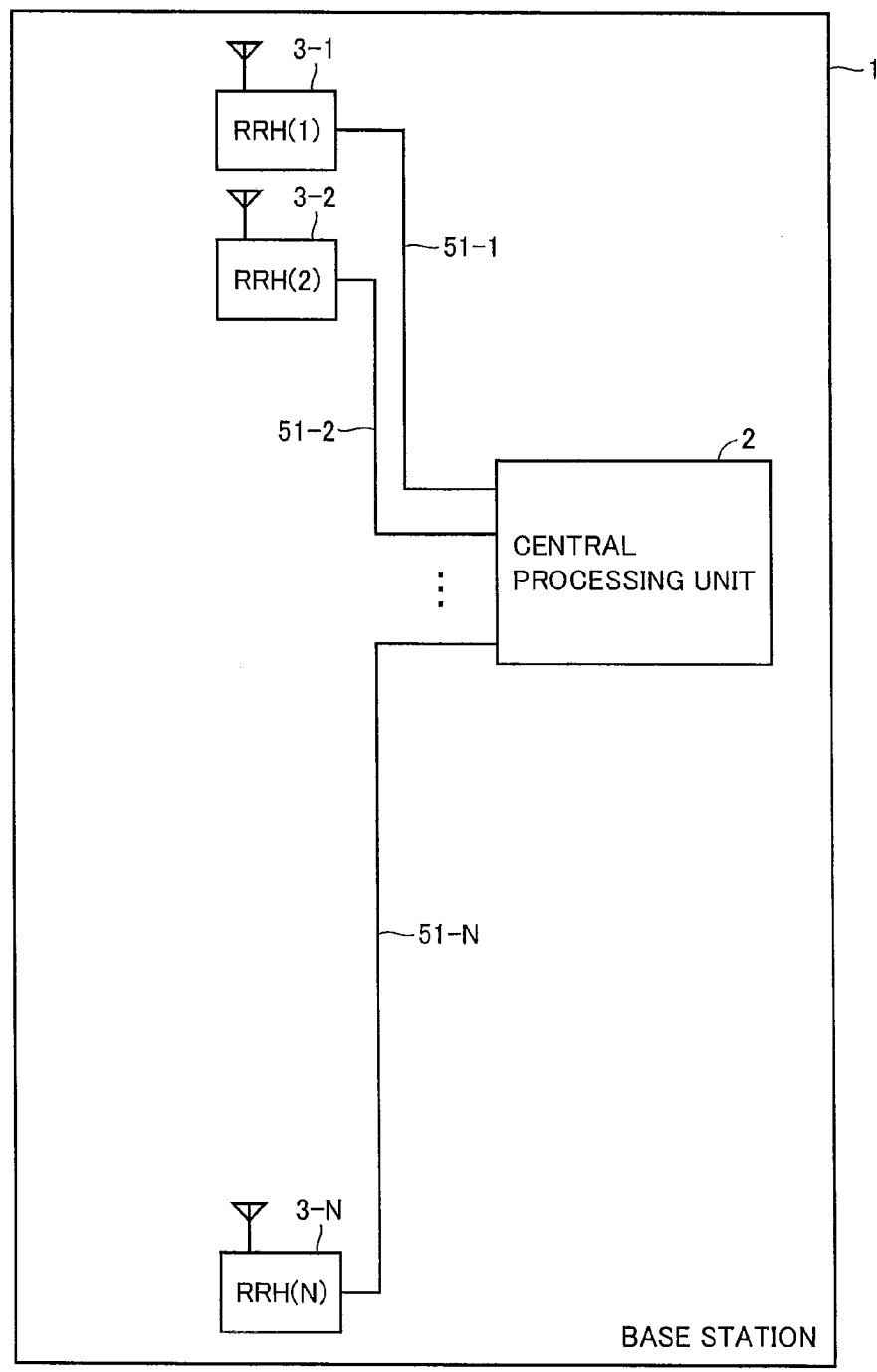
FIG. 1 shows a whole structure of a radio base station of an embodiment of the invention.

FIG. 1 shows a whole structure of a radio base station of an embodiment of the invention.

Referring to FIG. 1, a radio base station 1 is formed of a central processing unit 2 and Remote Radio Heads RRH(1) 3-1-RRH(N) 3-N which are physically independent of each other. RRH(1) 3-1-RRH(N) 3-N are arranged in different locations, respectively. RRH(1) 3-1-RRH(N) 3-N receive uplink signals from radio terminals, and transmit downlink signals to the radio terminals.

Central processing unit 2 receives uplink signals from RRH(1) 3-1-RRH(N) 3-N, and transmits downlink signals to RRH(1) 3-1-RRH(N) 3-N.

Central processing unit 2 is connected to RRH(1) 3-1-RRH(N) 3-N through optical fibers 51-1-51-N or the like, respectively.

Structure of the Radio Base Station

Figure 2:
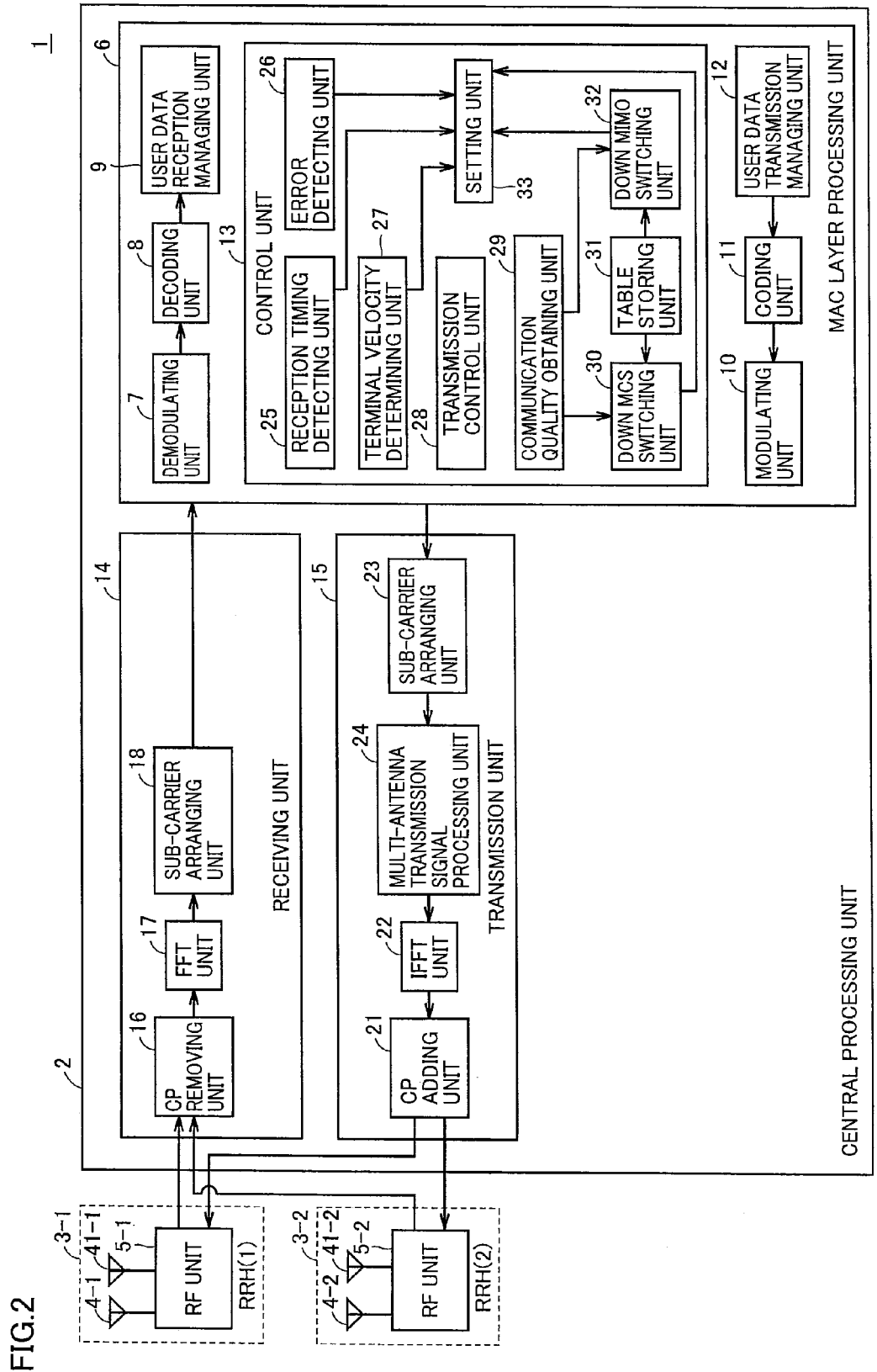
FIG. 2 shows a specific structure of the radio base station of the embodiment of the invention.

FIG. 2 shows a specific structure of the radio base station of the embodiment of the invention.

Referring to FIG. 2, radio base station 1 includes central processing unit 2, RRH(1) 3-1 and RRH(2) 3-2. For the sake of illustration, FIG. 2 shows two RRHs. However, the RRHs may be three of more in number.

Each of RRH(1) 3-1 and RRH(2) 3-2 includes first antennas 4-1 and 4-2, second antennas 41-1 and 41-2, and RF units 5-1 and 5-2. Each of RF units 5-1 and 5-2 includes an up converter for performing up-conversion to a radio frequency band, a power amplifier circuit for amplifying the up-converted signal, a band pass filter for passing only signal components in a desired band of the amplified signal and providing them to first antennas 4-1 and 4-2 as well as second antennas 41-1 and 41-2, and others. Further, each of RF units 5-1 and 5-2 includes a band pass filter for passing only signal components in a desired band of the signal to be provided from first antennas 4-1 and 4-2 as well as second antennas 41-1 and 41-2, a low-noise amplifier circuit for amplifying an RF signal and a down-converter for down-converting the RF signal.

Figure 3:
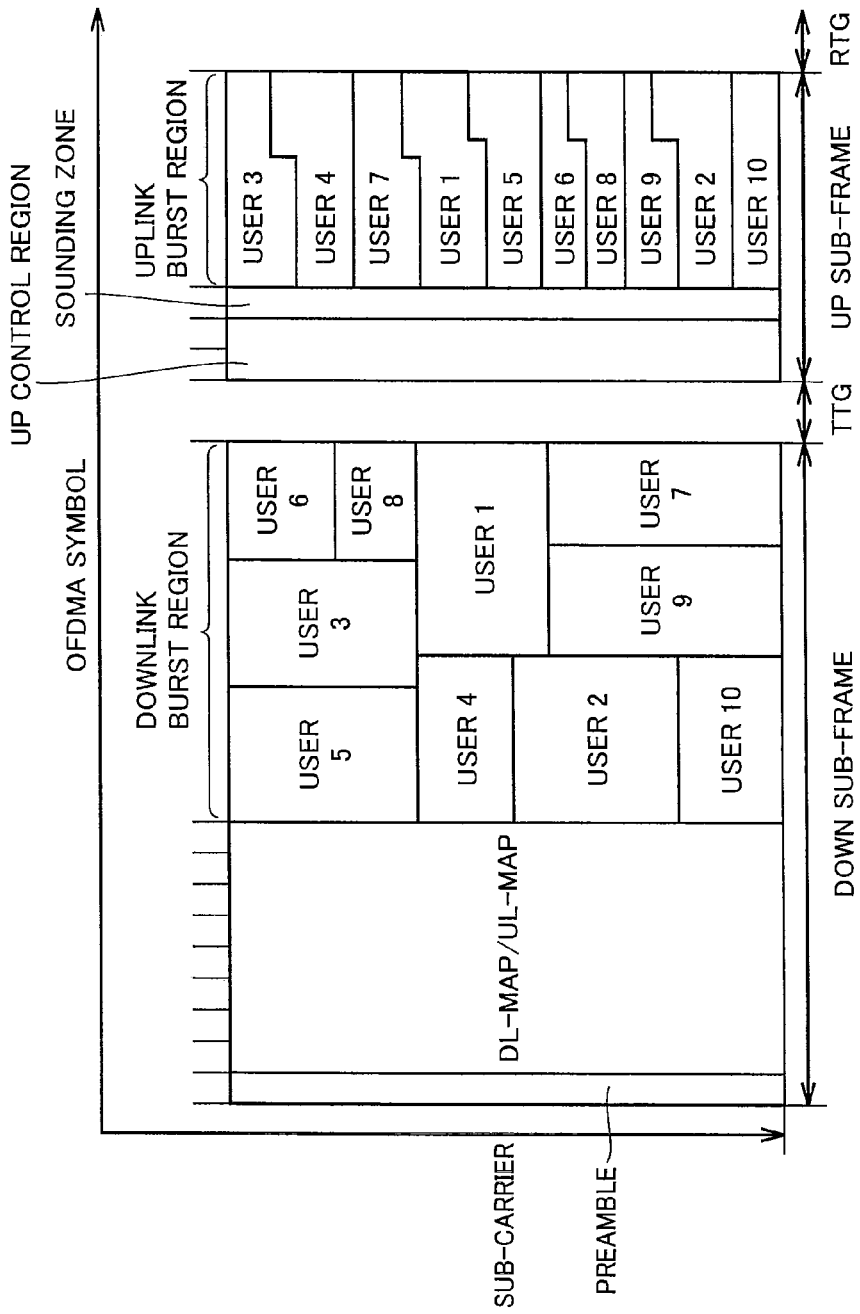
FIG. 3 shows a structure of an OFDMA (Orthogonal Frequency Division Multiple Access) frame transmitted from the radio base station of the embodiment of the invention.

FIG. 3 shows a structure of an OFDMA (Orthogonal Frequency Division Multiple Access) frame transmitted from the radio base station of the embodiment of the invention.

Referring to FIG. 3, the OFDMA frame is formed of a down sub-frame and an up sub-frame.

The down sub-frame includes a preamble, a DL-MAP (Downlink Map), an UL-MAP (Uplink Map) and a downlink burst region. In the preamble, a known signal for establishing synchronization and others is arranged. In the DL-MAP, there is arranged information about allocation of a down radio resource. For example, in the DL-MAP, there is arranged information relating to a burst region for down user data, a transmission cycle of a ranging signal (ranging cycle), MCS of the down user data, a velocity state of the radio terminal and others. Allocation information for the up radio resource is arranged in the UL-MAP. For example, information relating to the burst region of the up user data is arranged in the UL-MAP. Down user data is arranged in the downlink burst region.

The up sub-frame includes an up control region, a sounding zone and an uplink burst region. A ranging signal as well as signals representing a channel quality and others are arranged in the up control region. A sounding signal is arranged in the sounding zone. Up user data is arranged in the uplink burst region.

Referring to FIG. 2 again, central processing unit 2 includes a transmission unit 15, a receiving unit 14 and an MAC (Media Access Control) layer processing unit 6.

Transmission unit 15 includes a sub-carrier arranging unit 23, a multi-antenna transmission signal processing unit 24, an IFFT (Inverse First Fourier Transform) unit 22 and a CP (Cyclic Prefix) adding unit 21.

Sub-carrier arranging unit 23 arranges a sub-carrier based on, e.g., PUSCs (Partial Usage of Sub-Channels).

Multi-antenna transmission signal processing unit 24 performs space-time coding (e.g., Alamouti coding) on one data stream when a down MIMO scheme is MATRIX-A. Multi-antenna transmission signal processing unit 24 performs spatial multiplexing on a plurality of data streams when the down MIMO scheme is MATRIX-B.

IFFT unit 22 converts a plurality of sub-carrier signals (signals in frequency ranges) provided from multi-antenna transmission signal processing unit 24 into time domain signals (OFDMA (Orthogonal Frequency Division Multiple Access) symbols) by the IFFT.

CP adding unit 21 adds, as a CP, a signal that is the same as a rear end portion of the OFDMA symbol to a leading end of the OFDMA symbol.

Receiving unit 14 includes a CP removing unit 16, an FFT unit 17 and a sub-carrier arranging unit 18.

CP removing unit 16 removes the CPs from the signals provided from RF units 5-1 and 5-2.

FFT unit 17 converts, by the FFT, the signals in the time domain provided from CP removing unit 16 into signals in a frequency domain to demodulate them into a plurality of sub-carriers.

Sub-carrier arranging unit 18 extracts each sub-carrier provided from FFT unit 17 based on, e.g., the PUSC.

MAC layer processing unit 6 includes a user data transmission managing unit 12, a coding unit 11, a modulating unit 10, a demodulating unit 7, a decoding unit 8, a user data reception managing unit 9 and a control unit 13.

User data transmission managing unit 12 manages the user data to be transmitted to the radio terminal.

Coding unit 11 encodes the coded downlink signal according to a coding rate of the MCS (Modulation and Code Scheme) set by a down MCS switching unit 30.

Modulating unit 10 modulates the downlink signal to be provided to the radio terminal according to the modulation scheme of the MCS set by down MCS switching unit 30.

Demodulating unit 7 demodulates the uplink signal provided from the radio terminal.

Decoding unit 8 decodes the demodulated uplink signal.

User data reception managing unit 9 manages the user data received from the radio terminal.

Control unit 13 includes a reception timing detecting unit 25, an error detecting unit 26, a terminal velocity determining unit 27, a setting unit 33 and a transmission control unit 28.

Reception timing detecting unit 25 detects reception timing of the uplink signal provided from the radio terminal and received by RRH(1) 3-1 as well as reception timing of the uplink signal provided from the radio terminal and received by RRH(2) 3-2.

Error detecting unit 26 executes, based on CRC (Circular Redundancy Check), the error detection on the uplink signal provided from the radio terminal and received by RRH(1) 3-1. Error detecting unit 26 sets error detection information ER(1) to "OK" when it does not detect an error within one frame, and sets error detection information ER(1) to "NG" when it detects an error within one frame. Likewise, error detecting unit 26 executes, based on the CRC, the error detection on the uplink signal provided from the radio terminal and received by RRH(2) 3-2. Error detecting unit 26 sets error detection information ER(2) to "OK" when it does not detect an error within one frame, and sets error detection information ER(2) to "NG" when it detects an error within one frame.

Setting unit 33 sets a part or all of the RRHs as the RRHs in the first group suitable for transmission of the downlink user data, based on the uplink or downlink signal received by at least one RRH among the plurality of RRHs.

Transmission control unit 28 controls the transmission of the downlink user data provided from the plurality of RRHs based on the setting of setting unit 33. Also, transmission control unit 28 executes the control to perform the space-time coding on one data stream and to provide it to the RRHs in the first group when the set MIMO scheme is the MATRIX-A, and executes the control to perform spatial multiplexing on the plurality of data streams and to provide them to the RRHs in the first group when the set MIMO scheme is the MATRIX-B.

Terminal velocity determining unit 27 calculates a correlation value between two or more reception response vectors, which are consecutive in terms of time, of the uplink signals sent from the radio terminal and received by RRHs(i) (i=1, 2) 3-1 and 3-2, and thereby estimates a Doppler frequency FD(i) of the radio terminal. Further, terminal velocity determining unit 27 calculates, as a value proportional to the Doppler frequency, a moving velocity VL(i) of the radio terminal viewed from RRH(i) 3-i. Among moving velocities VL(i) (i=1, 2, ... N), terminal velocity determining unit 27 detects the highest velocity as moving velocity VL of the radio terminal. For example, Japanese Patent Laying-Open No. 2003-32167 refers to a more specific principle of calculating the moving velocity.

Control unit 13 includes a communication quality obtaining unit 29, a down MCS switching unit 30, a table storing unit 31 and a down MIMO switching unit 32.

Communication quality obtaining unit 29 receives a notification about a packet error rate of the downlink signal that is measured by the radio terminal and is set therefrom, and stores the notified packet error rate.

Table storing unit 31 stores first and second tables that determine the switching rules of the down communication level.

Down MCS switching unit 30 switches the down MCS according to the packet error rate of the downlink signal obtained by communication quality obtaining unit 29. Down MCS switching unit 30 switches the down MCS based on the first table when the RRH belonging to the first group is one in number, and switches the down MCS based on the second table when the RRHs belonging to the first group are two or more.

Down MIMO switching unit 32 switches the down MIMO scheme according to the packet error rate of the downlink signal obtained by communication quality obtaining unit 29. Down MIMO switching unit 32 switches the down MIMO scheme based on the first table when the RRH belonging to the first group is one in number, and switches the down MIMO scheme based on the second table when the RRHs belonging to the first group are two or more.

Down Communication Level Table

FIG. 4 shows an example of the down communication level table.

Referring to FIG. 4, the down communication level table represents a relationship between the down communication level, the down MIMO scheme and the down MCS, and the data transmission rate.

For example, "A1" of the down communication level represents that the down MIMO scheme is "MATRIX-A", the down MCS is "QPSK ½" and the data transmission rate is "1" (bit/symbol).

When the level changes from one among "A1"-"A7" to one among "B1"-"B7", i.e., when the MIMO scheme changes from the MATRIX-A to the MATRIX-B, this specification describes it as "the level of MATRIX increases" or the like. When the level changes from one among "B1"-"B7" to one among "A1"-"A7", i.e., when the MIMO scheme changes from the MATRIX-B to the MATRIX-A, this specification describes it as "the level of MATRIX decreases" or the like. When the MCS changes to that of a higher data rate without changing the MIMO scheme, this specification describes it as "the level of MCS rises" or the like. When the MCS changes to that of a lower data rate without changing the MIMO scheme, this specification describes it as "the level of MCS lowers" or the like.

Down Communication Level Switching Rule

Figure 5:
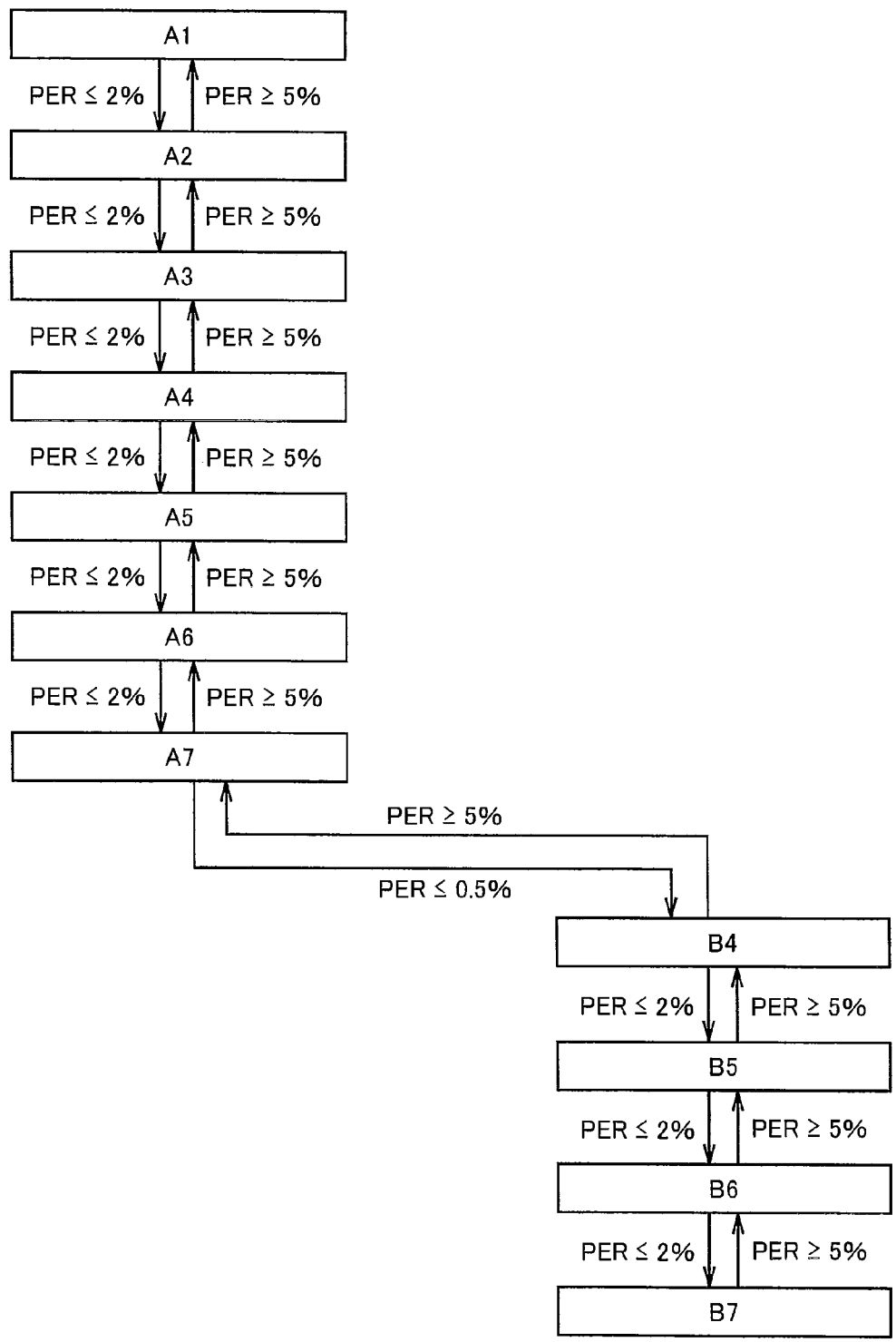
FIG. 5 shows a down communication level switching rule according to a first table.

FIG. 5 shows a down communication level switching rule according to a first table.

Referring to FIG. 5, when the down communication level is currently "A2" and a packet error rate PER of the downlink signal is 5% or higher, the down communication level lowers to "A1". Thus, down MCS switching unit 30 changes the down MCS from "QPSK ¾" to "QPSK ½". Down MIMO switching unit 32 keeps the down MIMO scheme at "MATRIX-A".

When the down communication level is currently "A2" and packet error rate PER of the downlink signal is 2% or lower, the down communication level rises to "A3". Thus, down MCS switching unit 30 changes the down MCS from "QPSK ¾" to "16 QAM ½". Down MIMO switching unit 32 keeps the down MIMO scheme at "MATRIX-A".

When the down communication level is currently "A7" and packet error rate PER of the downlink signal is 0.5% or lower, the down communication level rises to "B4". Thus, down MCS switching unit 30 changes the down MCS from "64QAM 3/4" to "16QAM 3/4". Down MIMO switching unit 32 changes the down MIMO scheme from "MATRIX-A" to "MATRIX-B".

Figure 6:
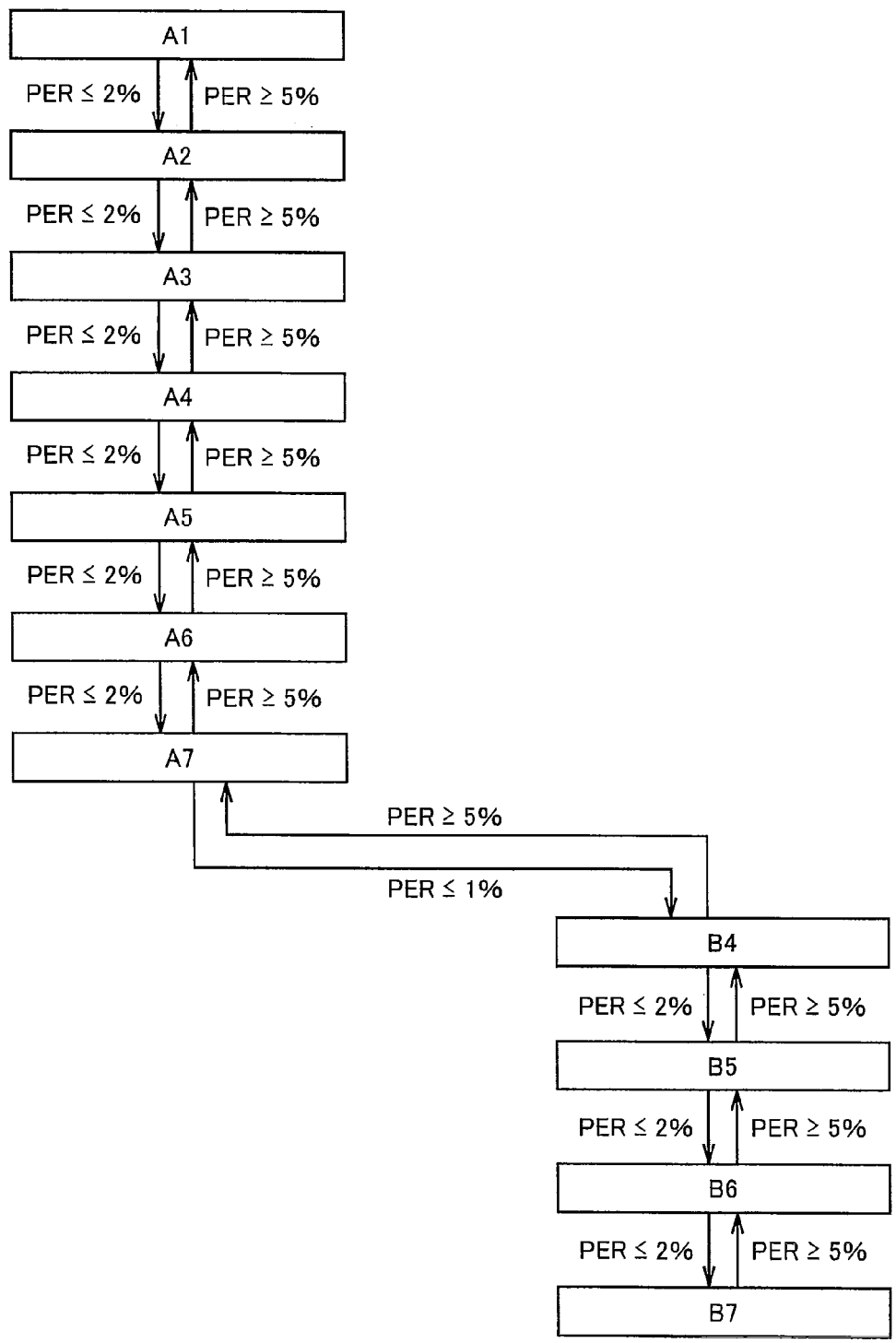
FIG. 6 shows the down communication level switching rule according to a second table.

FIG. 6 shows the down communication level switching rule according to the second table.

The second table in FIG. 6 differs from the first table in FIG. 5 in condition for raising the down communication level from "A7" to "B4".

Thus, in FIG. 6, when the down communication level is currently "A7" and packet error rate PER of the downlink signal is 1% or lower, the down communication level rises to "B4". Thus, down MCS switching unit 30 changes the down MCS from "64QAM 3/4" to "16QAM 3/4". Down MIMO switching unit 32 changes the down MIMO scheme from "MATRIX-A" to "MATRIX-B".

As described above, in the case where the RRHs belonging to the first group are two or more in number, the conditions that relate to the communication quality and are set for switching the setting of the MIMO scheme from the MATRIX-A to the MATRIX-B are lower than those set in the case where the RRH belonging to the first group is one. This is because usage of the signals from the two or more RRHs located in spaced positions, respectively, allows lowering of a spatial correlation between antennas, as compared with the case of using only one RRH, and consequently improves the performance of the MATRIX-B (spatial multiplexing MIMO).

Operation of the Radio Communication System

Figure 7:
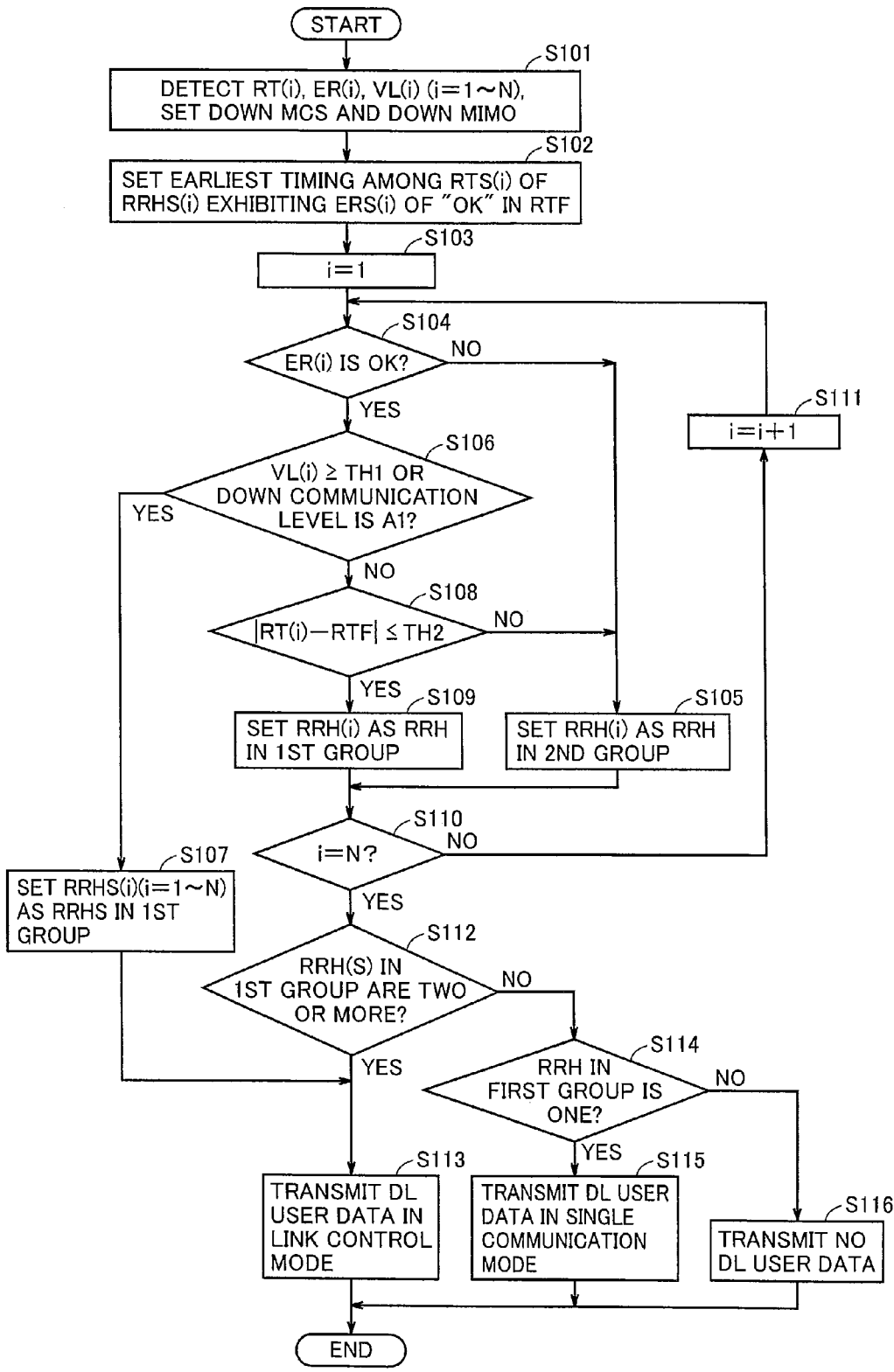
FIG. 7 is a flowchart illustrating an operation procedure of a radio communication system of the embodiment of the invention.

FIG. 7 is a flowchart illustrating an operation procedure of the radio communication system of the embodiment of the invention. Processing is performed frame by frame. In FIG. 7, it is assumed that the RRHs are N in number. Also, the radio terminal of the communication party at the other end is a radio terminal A.

Referring to FIG. 7, reception timing detecting unit 25 detects reception timing RT(i) of the uplink signal provided from radio terminal A and received by RRHs(i) (i=1, 2, ... N).

Error detecting unit 26 executes, based on the CRC, the error detection on the uplink signal provided from radio terminal A and received by RRHs(i) (i=1, 2, ... N). Error detecting unit 26 sets error detection information ER(i) to "OK" when it does not detect an error in one frame, and sets error detection information ER(i) to "NG" when it detects an error in one frame.

Based on packet error rate PER of the downlink signal provided to radio terminal A, down MCS switching unit 30 sets the down MCS according to the first table.

Based on packet error rate PER of the downlink signal provided to radio terminal A, down MIMO switching unit 32 sets the down MIMO scheme according to the first table.

Based on respective uplink signals provided from radio terminal A and received by RRHs(i) (i=1, 2, ... N), terminal velocity determining unit 27 determines moving velocity VL(i) of radio terminal A (step S101).

Then, reception timing detecting unit 25 sets, as the earliest reception timing RTF, the earliest reception timing RT(i) among reception timings RT(i) (i=1, 2, ... N) of the RRHs(i) exhibiting ERs (i) of "OK", respectively (step S102).

Then, setting unit 33 sets the number i of the RRH to 1 (step S103).

First, when error detection information ER(i) is "NG" (NO in step S104), setting unit 33 sets the RRH(i) as the RRH in a second group (step S105).

When error detection information ER(i) is "OK" (YES in step S104), setting unit 33 sets all the RRHs(i) (i=1, 2, ... N) as the RRHs in the first group in the case where moving velocity VL(i) determined based on the signals received by the RRHs(i) of radio terminal RRH is equal to or higher than a threshold TH1 (in which case it is determined that radio terminal A is moving fast), or in the case where the down communication level is "A1" that is the lowest level within a range allowing the setting (YES in step S106). When the communications are to be performed with the radio terminal that is moving fast, all the RRHs(i) (i=1, 2, ... N) are set as the RRHs in the first group, because it can be presumed that a fast radio terminal moves over a wide range, and therefore it is desired to expand as large as possible an area covered by the radio base station. When the down communication level is the lowest level, i.e., "A1", all the RRHs(i) (i=1, 2, ... N) are set as the RRHs in the first group, because a low communication level may cause abnormal cutoff of the communications and therefore it is desired to perform the communications by as many RRHs as possible (step S107).

When moving velocity VL(i) of radio terminal A is smaller than threshold TH1 and the down MCS is not at the lowest level (NO in step S106), setting unit 33 sets the RRH(i) as the RRH in the second group (step S105) in the case where a difference between reception timing RT(i) and the earliest reception timing RTF exceeds a threshold TH2 (e.g., a guard interval period) (NO in step S108).

When a difference between reception timing RT(i) and the earliest reception timing RTF is equal to or smaller than threshold TH2 (YES in step S108), setting unit 33 sets the RRH(i) as the RRH in the first group (step S109).

When the number i of the RRH is not N (NO in step S110) after steps S105 and S109, the number i of the RRH is incremented by one (step S111).

When the number i of the RRH is N (YES in step S110), the process proceeds to a next step S112.

When two or more RRHs belong to the first group (YES in step S112), transmission control unit 28 performs the control to transmit, in the link control mode, the downlink user data to radio terminal A from all the RRHs belonging to the first group (step S113).

Conversely, when the RRH belonging to the first group is one in number (NO in step S112 and YES in step S114), transmission control unit 28 performs the control to transmit, in the single communication mode, the downlink user data to radio terminal A from the one RRH belonging to the first group (step S115).

When the RRH belonging to the first group is zero in number (NO in step S112 and NO in step S114), transmission control unit 28 does not transmit the downlink user data to radio terminal A. In this case, the downlink signals transmitted to radio terminal A are only the control signals such as preamble, DL-MAP and UL-MAP (step S116).

Operation in the Link Control Mode

Figure 8:
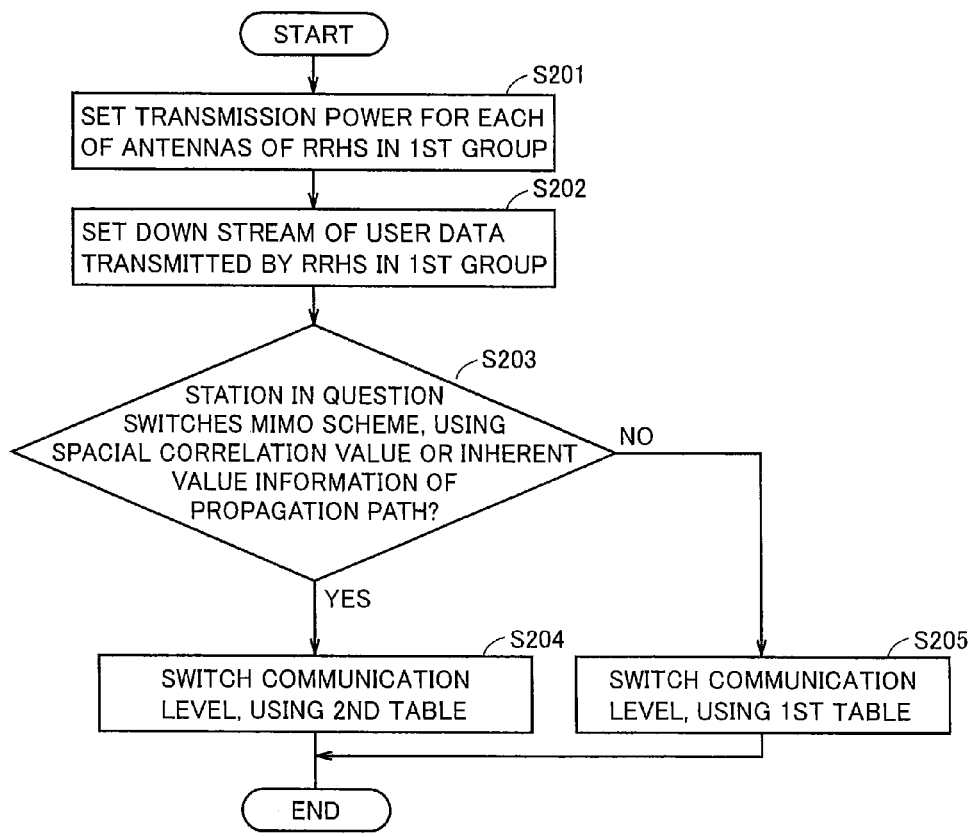
FIG. 8 is a flowchart illustrating an operation procedure in a link control mode of the embodiment of the invention.

FIG. 8 is a flowchart illustrating an operation procedure in the link control mode of the embodiment of the invention.

Referring to FIG. 8, transmission control unit 28 sets the transmission powers for the respective antennas of the RRHs in the first group. For example, transmission control unit 28 sets the same transmission power for all the antennas of the RRHs in the first group (step S201).

Then, transmission control unit 28 sets the down stream of the user data to be transmitted to the RRHs in the first group. For example, transmission control unit 28 sets the same down stream for all the RRHs in the first group (step S202).

When the station in question is performing the switching of the down MIMO scheme, using a spatial correlation coefficient or an inherent value information of the propagation path (YES in step S203), down MIMO switching unit 32 switches the down MIMO scheme, using the second table shown in FIG. 6 (step S204).

Conversely, when the station in question is not performing the switching of the down MIMO scheme, using the spatial correlation coefficient or the inherent value information of the propagation path (NO in step S203), down MIMO switching unit 32 switches the down MIMO scheme, using the first table shown in FIG. 5 (step S205).

The conditions in step S203 are employed for the following reason. When the RRHs arranged in a plurality of different locations, respectively, are used in the radio base station that has been performing the switching control using the spatial correlation value or the parameter equivalent to the spatial correlation value since the start of the control, the spatial correlation value automatically decreases to attain the state suitable for the connection by the MATRIX-B (spatial multiplexing MIMO), and therefore control for easing the threshold is not necessary.

As described above, the radio base station of the embodiment of the invention can reduce the difference in reception timing of the signals received from the plurality of RRHs, and therefore can receive well the signals from the plurality of RRHs.

Second Embodiment

In the first embodiment, when moving velocity VL(i) determined based on the uplink signal that is received by the RRH(i) of radio terminal A is equal to or larger than threshold TH1 (condition α), or when the data transmission level is the lowest "A1" within the range of the down communication level that can be set (condition β) (YES in step S106), all the RRHs(i) (i=1, 2, . . . N) are set as the RRHs in the first group.

According to the second embodiment, all the RRHs(i) (i=1, 2, . . . N) are set as the RRHs in the first group in the cases of not only the conditions "α" and "β" but also other conditions.

Figure 9:
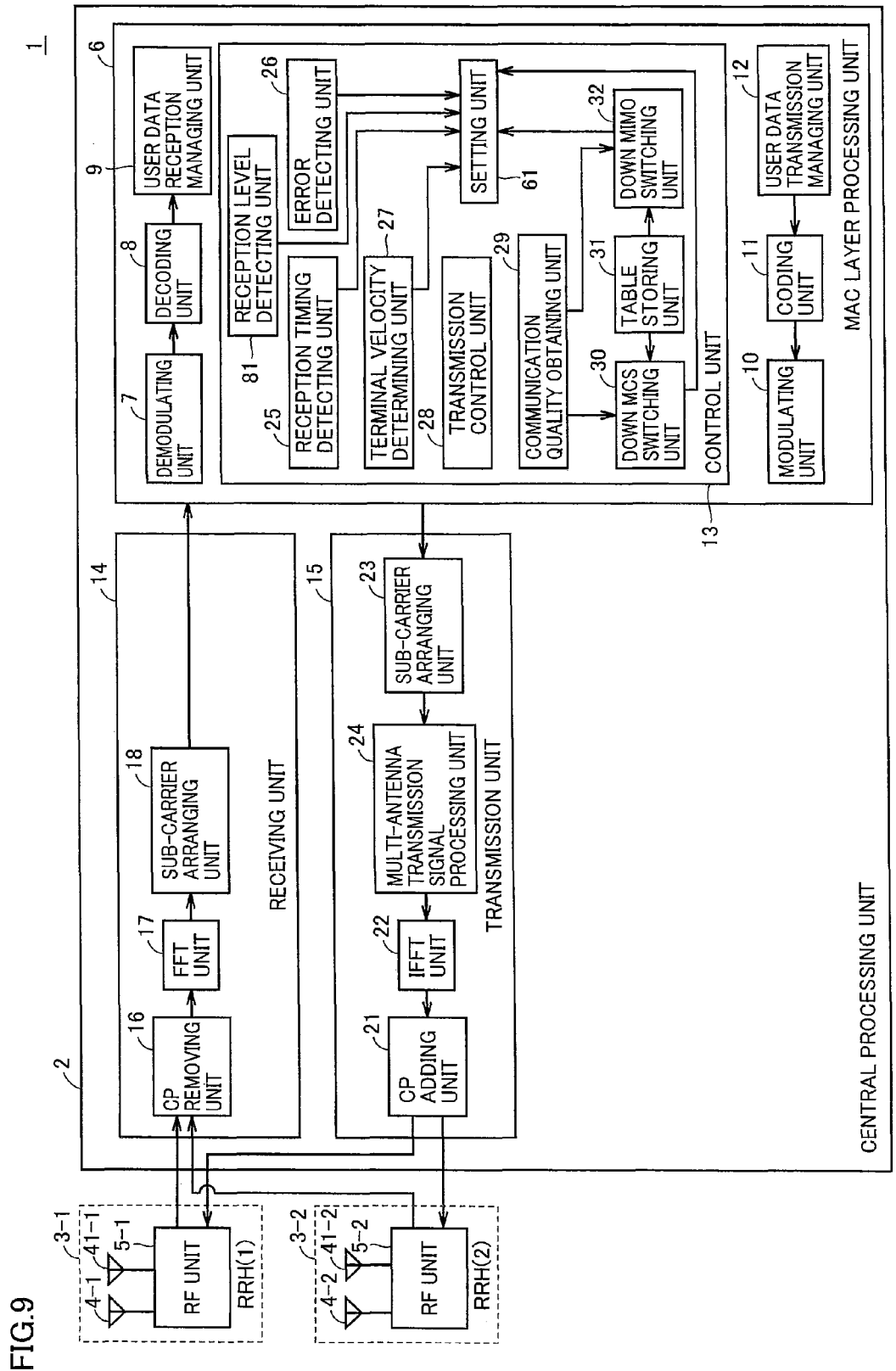
FIG. 9 shows a specific structure of a radio base station of a second embodiment.

FIG. 9 shows a specific structure of a radio base station of the second embodiment.

The radio base station in FIG. 9 differs from the radio base station in FIG. 2 in the following points.

A reception level detecting unit 81 detects the reception level of the uplink signal transmitted from radio terminal A and received by the RRH(i) while keeping such a state that a user currently performing the communications can confirm it.

In addition to conditions α and β, a setting unit 61 further sets all the RRHs(i) (i=1, 2, . . . N) as the RRHs in the first group in the case (condition γ) where the reception levels of the uplink signals transmitted from radio terminal A and received by the RRHs(i) are equal to or lower than a predetermined value.

Third Embodiment

Similarly to the second embodiment, a third embodiment sets all the RRHs(i) (i=1, 2, . . . N) as the RRHs in the first group in the cases of not only conditions α and β but also other conditions.

Figure 10:
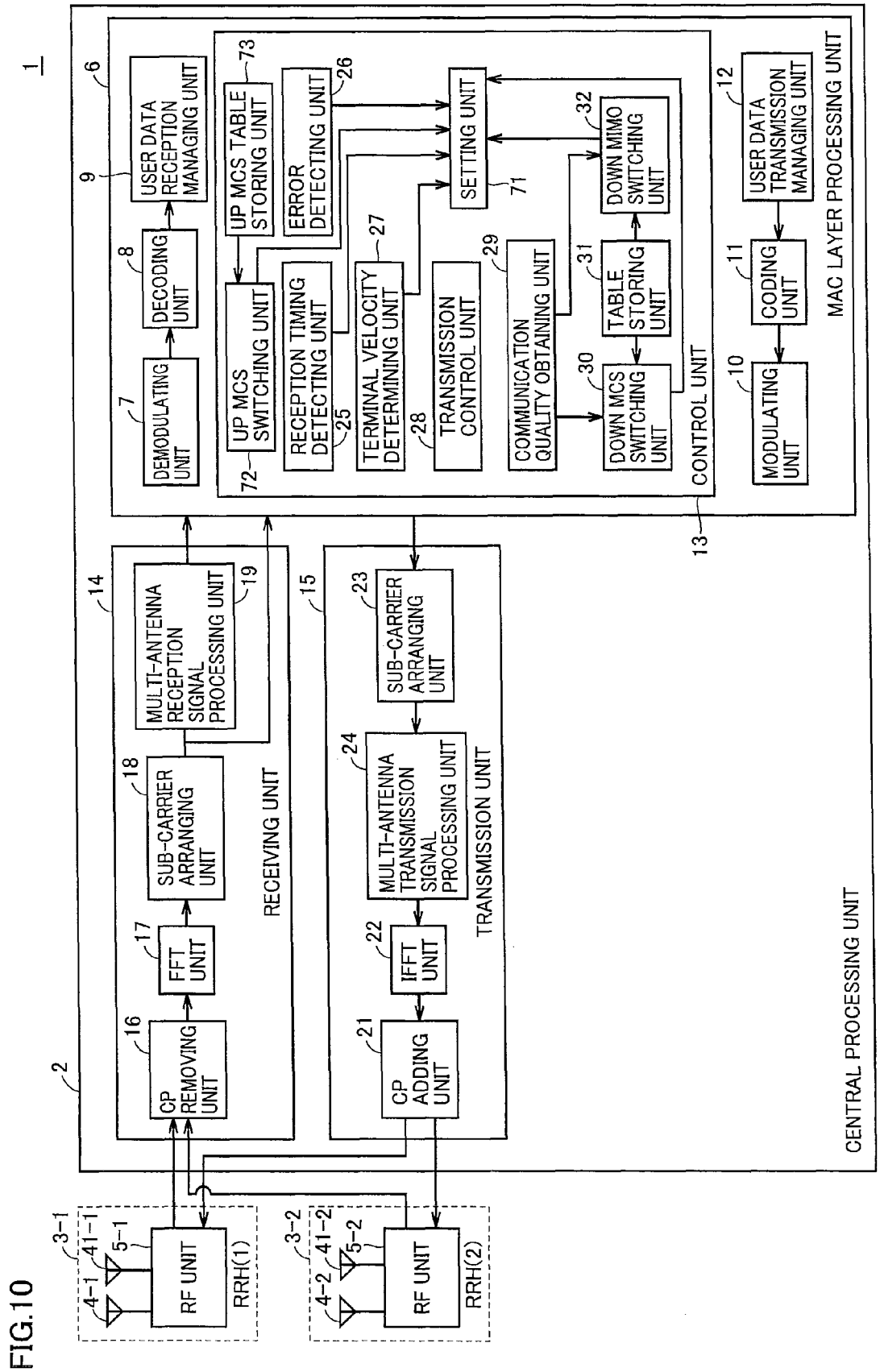
FIG. 10 shows a specific structure of a radio base station of a third embodiment.

FIG. 10 shows a specific structure of a radio base station of the third embodiment.

The radio base station in FIG. 10 differs from the radio base station in FIG. 2 in the following points.

A multi-antenna reception signal processing unit 19 demodulates the received signal by MRC (Maximum Ratio Combining), adaptive array processing (RLS (Recursive Least Squares), SMI (Sample Matrix Inversion), LMS (Least Means Square) algorithm or the like), MLD (Maximum Likelihood Detection) or the like.

An up MCS table storing unit 73 stores a third table that specifies the switching rules of the up communication level.

An up MCS switching unit 72 switches the up MCS according to a packet error rate of the uplink signal detected by error detecting unit 26. Up MCS switching unit 72 switches the up MCS based on a third table stored, e.g., in up MCS table storing unit 73.

Up Communication Level Table

FIG. 11 shows an example of the up communication level table.

Referring to FIG. 11, the up communication level table represents a relationship between the up communication level, the up MCS and the data transmission rate.

For example, "A1" of the up communication level represents that the up MCS is "QPSK ½" and the data transmission rate is "1" (bit/symbol).

Up Communication Level Switching Rule

Figure 12:
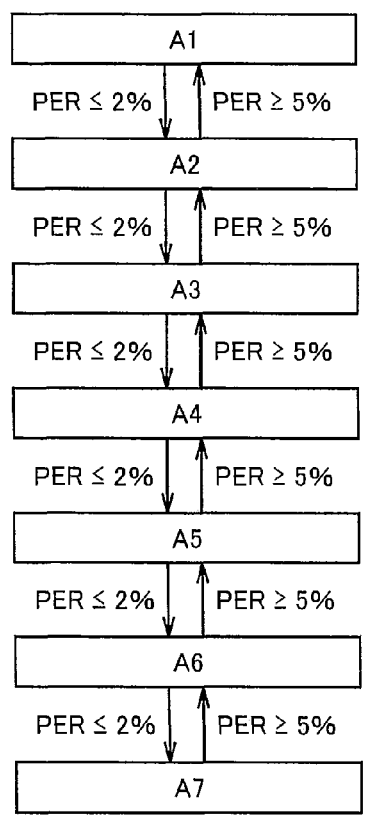
FIG. 12 shows an up communication level switching rule according to a third table.

FIG. 12 shows the up communication level switching rule according to the third table.

Referring to FIG. 12, for example, when the up communication level is currently "A2", and packet error rate PER of the uplink signal is 5% or more, the up communication level lowers to "A1". Thus, up MCS switching unit 72 changes the up MCS from "QPSK ¾" to "QPSK ½".

When the communication level is currently "A2" and packet error rate PER of the uplink signal is 2% or lower, the up communication level rises to "A3". Thus, up MCS switching unit 72 changes the up MCS from "QPSK ¾" to "16 QAM ½".

A setting unit 71 sets all the RRHs(i) (i=1, 2, ... N) as the RRHs in the first group in the cases of the conditions α and β as well as the case (condition γ) where the data transmission level is the lowest level "A1" within a range allowing the setting of the up communication level.

Modifications

The present invention is not restricted to the foregoing embodiments, but includes the following modifications.

(1) Link Control Mode

In the embodiment of the invention, transmission control unit 28 controls the transmission unit to output the downlink user data only to the RRHs belonging to the first group in the link control mode. However, this is not restrictive.

For example, the transmission unit provides the downlink user data to all the RRHs. In the link control mode, the transmission control unit may be configured to transmit the control signal to the RRHs belonging to the first group for transmitting the downlink user data (in the case where it is not transmitted in a default setting). Alternatively, it may be configured to transmit the control signal to the RRHs belonging to the second group for not transmitting the downlink user data (in the case where it is transmitted in the default setting). Further, it may be configured to transmit the control signal to the RRHs belonging to the first group for transmitting the downlink user data, and to transmit the control signal to the RRHs belonging to the second group for not transmitting the downlink user data.

Further, transmission control unit 28 may be configured to transmit the control signal to the RRHs in the first group such that the RRHs in the first group transmit the downlink user data with the transmission power at the level of L1, and the RRHs in the second group transmit the downlink user data with the transmission power at the level of L2 smaller than L1 (the default transmission power is L2). Alternatively, transmission control unit 28 may be configured to transmit the control signal to the RRHs in the second group such that the RRHs in the first group transmit the downlink user data with the transmission power at the level of L1, and the RRHs in the second group transmit the downlink user data with the transmission power at the level of L2 smaller than L1 (the default transmission power is L1). Further, transmission control unit 28 may be configured to transmit the control signal to the RRHs in the first group and the RRHs in the second group such that the RRHs in the first group transmit the downlink user data with the transmission power at the level of L1, and the RRHs in the second group transmit the downlink user data with the transmission power at the level of L2 smaller than L1.

The above level L2 of the transmission power is set to prevent interference with signals transmitted from another RRH in the same base station, another radio base station or radio terminals as far as possible.

(2) Power Distribution

In this embodiment of the invention, the transmission powers of all the antennas of the RRHs in the first group are set equal to each other in step S201 in FIG. 8. However, this is not restrictive.

For example, the power control unit may distribute the power by Maximum Ratio Combining (MRC). Thus, the power control unit may set, for each antenna, the transmission power proportional to the reception level of the antenna in question.

Alternatively, the power control unit may take an average of the reception levels of the plurality of antennas belonging to one RRH, and may set the transmission power proportional to the reception level thus averaged for all the antennas belonging to the RRH in question.

Alternatively, for maximizing the transmission capacity, the power control unit may distribute the transmission power among the antennas or the RRHs according to the water filling principle.

(3) Stream

In the embodiment of the invention, the same stream is set in all the RRHs in the first group in step S202 in FIG. 8. However, this is not restrictive.

For example, an independent down stream may be set for each RRH or each antenna.

(4) Communication Level

According to the embodiment of the invention, the communication level defining the data transmission rate is determined according to the differences in MCS and MATRIX scheme. However this is not restrictive.

For example, when the MIMO scheme is not changed, the data transmission rate (communication level) may be specified according to only the difference in MCS. The data transmission rate (communication level) may be specified according to only the difference in MIMO scheme.

(5) Terminal Moving Velocity Detection

According to the embodiment of the invention, the terminal velocity determining unit calculates the moving velocity based on the reception response vector of each radio terminal that is currently performing the communications. However this is not restrictive.

The memory may store information for determining whether each radio terminal is moving at a predetermined velocity or more, or not, and the terminal velocity determining unit may be configured to determine the moving velocity of the currently communicating radio terminal based on the information in the memory.

(6) Error Detection Information

In the embodiment of the invention, the setting unit sets the RRHs(i) as the RRHs in the second group when error detection information ER(i) is "NG", i.e., an error is detected within one frame (NO in step S106). However, this is not restrictive.

The setting unit may be configured to set the RRHs(i) as the RRHs in the second group when an average of EVMs (Error Vector Magnitudes) of the uplink signals received by the RRHs(i) of radio terminal within one frame is equal to or larger than a predetermined value.

Although the present invention has been described and illustrated in detail, it is clearly understood that the same is by way of illustration and example only and is not to be taken by way of limitation, the scope of the present invention being interpreted by the terms of the appended claims.

REFERENCE SIGNS LIST 1 radio base station, 2 central processing unit, 3-1-3-N RRH(i)-RRH(N), 4-1, 4-2 first antenna, 41-1, 41-2 second antenna, 5-1, 5-2 RF unit, 6 MAC layer processing unit, 7 demodulating unit, 8 decoding unit, 9 user data reception managing unit, 10 modulating unit, 11 coding unit, 12 user data transmission managing unit, 13 control unit, 14 receiving unit, 15 transmission unit, 16 CP removing unit, 17 FFT unit, 18, 23 sub-carrier arranging unit, 19 multi-antenna reception signal processing unit, 21 CP adding unit, 22 IFFT unit, 24 multi-antenna transmission signal processing unit, 25 reception timing detecting unit, 26 error detecting unit, 27 terminal velocity determining unit, 28 transmission control unit, 29 communication quality obtaining unit, 30 down MCS switching unit, 31 table storing unit, 32 down MIMO switching unit, 33, 61, 71 setting unit, 51-1-51-N optical fiber, 72 up MCS switching unit, 73 up MCS table storing unit, 81 reception level detecting unit.

The invention claimed is:

1. A radio base station, comprising:
a plurality of remote radio heads being physically independent of each other, and arranged in different positions, respectively, for receiving an uplink signal from a radio terminal and transmitting a downlink signal to said radio terminal; and
a central processing unit for receiving said uplink signal from said plurality of remote radio heads, and transmitting said downlink signal to said plurality of remote radio heads,
wherein said central processing unit includes:
a setting unit for setting a part or all of said plurality of remote radio heads as the remote radio heads in a first group suitable for transmission of downlink user data, based on the uplink signal or the downlink signal received by at least one of said plurality of remote radio heads, and
a transmission control unit for controlling transmission of the downlink user data from said plurality of remote radio heads based on said setting,
wherein said setting unit sets all of said plurality of remote radio heads as the remote radio heads in said first group when it is determined that the radio terminal having transmitted said uplink signal is moving fast, based on the uplink signal received by at least one of said plurality of remote radio heads.

2. A radio base station, comprising:
a plurality of remote radio heads being physically independent of each other, and arranged in different positions, respectively, for receiving an uplink signal from a radio terminal and transmitting a downlink signal to said radio terminal; and
a central processing unit for receiving said uplink signal from said plurality of remote radio heads, and transmitting said downlink signal to said plurality of remote radio heads,
wherein said central processing unit includes:
a setting unit for setting a part or all of said plurality of remote radio heads as the remote radio heads in a first group suitable for transmission of downlink user data, based on the uplink signal or the downlink signal received by at least one of said plurality of remote radio heads, and
a transmission control unit for controlling transmission of the downlink user data from said plurality of remote radio heads based on said setting,
wherein said setting unit sets all of said plurality of remote radio heads as the remote radio heads in said first group when at least one of said plurality of remote radio heads receives the uplink signal at a reception level equal to or smaller than a predetermined value.

3. A radio base station, comprising:
a plurality of remote radio heads being physically independent of each other, and arranged in different positions, respectively, for receiving an uplink signal from a radio terminal and transmitting a downlink signal to said radio terminal; and
a central processing unit for receiving said uplink signal from said plurality of remote radio heads, and transmitting said downlink signal to said plurality of remote radio heads,
wherein said central processing unit includes:
a setting unit for setting a part or all of said plurality of remote radio heads as the remote radio heads in a first group suitable for transmission of downlink user data, based on the uplink signal or the downlink signal received by at least one of said plurality of remote radio heads, and
a transmission control unit for controlling transmission of the downlink user data from said plurality of remote radio heads based on said setting,
wherein said setting unit sets all of said plurality of remote radio heads as the remote radio heads in said first group when a communication level of the uplink signal transmitted from said radio terminal or the downlink signal transmitted to said radio terminal corresponds to a minimum level of a data transfer rate within a range allowing setting.

4. A radio base station, comprising:
a plurality of remote radio heads being physically independent of each other, and arranged in different positions, respectively, for receiving an uplink signal from a radio terminal and transmitting a downlink signal to said radio terminal; and
a central processing unit for receiving said uplink signal from said plurality of remote radio heads, and transmitting said downlink signal to said plurality of remote radio heads,
wherein said central processing unit includes:
a setting unit for setting a part or all of said plurality of remote radio heads as the remote radio heads in a first group suitable for transmission of downlink user data, based on the uplink signal or the downlink signal received by at least one of said plurality of remote radio heads, and
a transmission control unit for controlling transmission of the downlink user data from said plurality of remote radio heads based on said setting,
wherein said setting unit detects an error in the uplink signals transmitted from said plurality of remote radio heads, and sets the remote radio heads having a fewest number of detected errors among the plurality of remote radio heads receiving the uplink signal as the remote radio heads in said first group.

* * * * *